United States Patent [19]

Rendell

[11] Patent Number: 4,458,956
[45] Date of Patent: Jul. 10, 1984

[54] BEARING ASSEMBLY

[75] Inventor: Frederick A. Rendell, Clevedon, England

[73] Assignee: Ampep P.L.C., Avon, England

[21] Appl. No.: 186,390

[22] Filed: Sep. 11, 1980

[30] Foreign Application Priority Data

Sep. 11, 1979 [GB] United Kingdom ............... 7931421

[51] Int. Cl.³ .................... F16C 32/00; F16C 27/06
[52] U.S. Cl. ................................................. 308/2 R
[58] Field of Search ............... 308/26, 72, 238, 184 R, 308/184 A, 194, 29, 2 R, 2 A; 384/213, 206, 222

[56] References Cited

U.S. PATENT DOCUMENTS 3,582,166  6/1971  Reising .
3,666,335  5/1970  Mundy et al. ................... 308/26
4,130,324  12/1978  Becker ............................ 308/72
4,183,590  1/1980  Lower ............................. 308/72

Primary Examiner—Lenard A. Footland
Attorney, Agent, or Firm—Armstrong, Nikaido, Marmelstein & Kubovcik

[57] ABSTRACT

A bearing assembly comprises an inner member, an intermediate element and an outer member. The intermediate element is mounted resiliently on the inner member by means of an elastomeric sleeve, and slidably engages the outer member. Small amplitude movement in the bearing is accommodated by the sleeve, while larger amplitude movement is accommodated by relative sliding movement between the intermediate element and the outer member. Because the cooperating surfaces of the intermediate element and the outer member are not subjected to the smaller amplitude movements, wear of these surfaces is reduced and the life of the bearing assembly is increased.

12 Claims, 8 Drawing Figures

BEARING ASSEMBLY

BACKGROUND OF THE INVENTION

This invention relates to a bearing asssembly,

Some bearing assemblies, for example those used in suspension systems of road and rail vehicles, are required to accommodate relatively large movements while at the same time being subjected to relatively low amplitude movements at high frequency, for example oscillations of ±2° at a frequency of 30 Hz.

Elastomeric bearings have been used in these circumstances, but a large bulk of elastomeric material is required in these bearings to provide the required range of movement without causing excessive radial and shear stresses in the material. This means that an elastomeric bearing is likely to be large and heavy, with high material costs.

Self-lubricating bearings have also been used. While these can be smaller than the equivalent elastomeric bearing, the low amplitude high frequency movements cause significant wear in the bearing material, and frequent replacement of the bearings is necessary. Thus, although a self-lubricating bearing can accommodate the required range of movements and can withstand high forces, its service life is often too short. For example, when used in a vehicle, replacement of the bearing may be necessary after 30,000 miles of vehicle operation.

BRIEF DESCRIPTION OF THE PRESENT INVENTION

According to the present invention there is provided a bearing assembly comprising two relatively moveable members and an intermediate element which is disposed between the two members, the intermediate element being mounted resiliently on one of the members and slidably engaging the other of the members, relative movement between the said one member and the intermediate element being limited by abutment of a portion of the intermediate element with a portion of the said one member.

Thus, in a bearing assembly in accordance with the present invention, movements of small amplitude can be accommodated by the resilient mounting of the intermediate element on the one member, while larger amplitude movements are accommodated by relative sliding between the intermediate element and the other member. Since the resilient mounting, which may comprise an elastomeric element between the intermediate element and the one member, is only required to accommodate relatively small amplitude movements, it can be compact so that the overall size of the bearing assembly can be relatively small compared to the equivalent elastomeric bearing. Furthermore, since the low amplitude movement does not cause relative movement between the intermediate element and the other member, wear of these two components is significantly reduced.

DETAILED DESCRIPTION OF PREFERRED EMBODIMENTS

Figure 1:
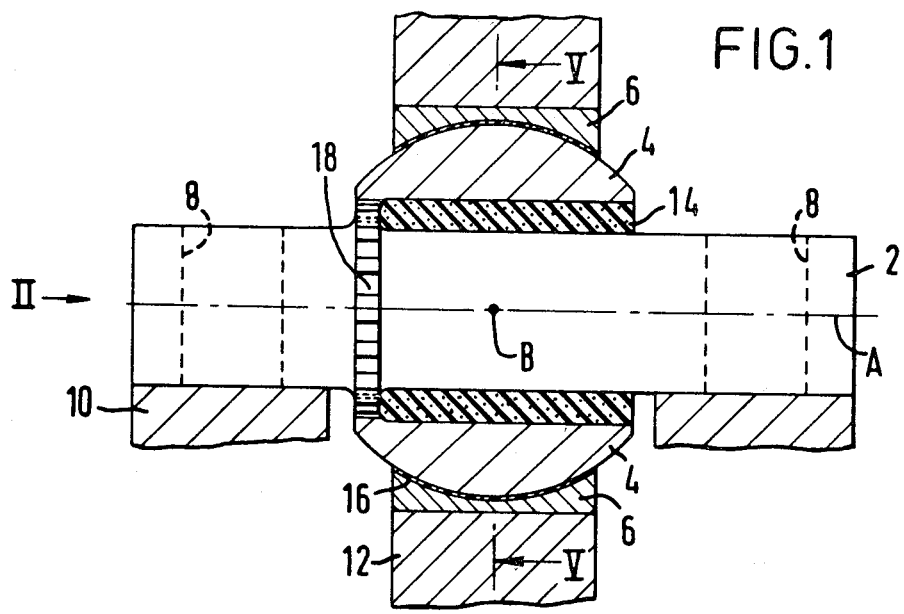
FIG. 1 is an axial cross-section through a bearing assembly.
Figure 2:
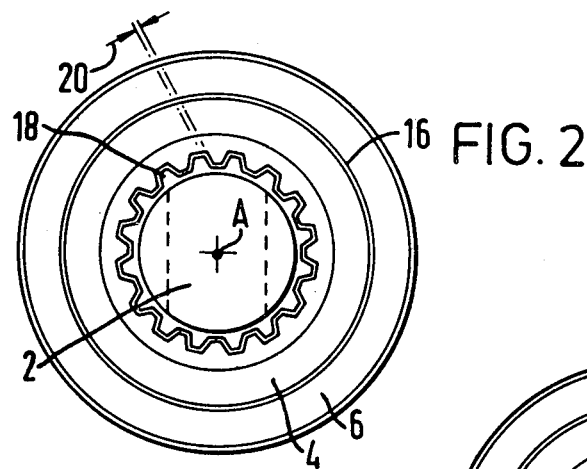
FIG. 2 is a view taken in the direction of the arrow II in FIG. 1.

The bearing assembly shown in FIGS. 1 and 2 comprises an inner member 2, an intermediate element 4 and an outer member 6. The inner member comprises a pin provided with holes 8 for securing it to a component 10, and the outer member is a bearing ring mounted in an opening in a component 12. The bearing assembly shown is a self-aligning bearing and may, for example, comprise part of a suspension system of a motor vehicle and its purpose may be to accommodate relative angular movement between the components 10 and 12 about the longitudinal axis of the inner member 2.

The intermediate element 4 is mounted on the pin 2 in a resilient manner by means of an elastomeric sleeve 14. This sleeve 14 allows the intermediate element 4 to move in any direction, to a limited extent, relatively to the pin 2.

The outer surface of the intermediate element 4 is spherical and is in surface sliding contact with a self-lubricating liner 16, which is bonded to the ring 6. The lining may, for example, be made of poly(tetrafluoroethylene).

Referring now to FIG. 2, it can be seen that the pin 2 and the intermediate element 4 are provided with inter-engaging teeth 18. There is enough clearance between the teeth 18, as indicated by the dimension 20, to allow relative rotation between the inner member 2 and the intermediate element 4 of about ±3°, for example, although a greater or smaller range of movement could be allowed.

Figure 3:
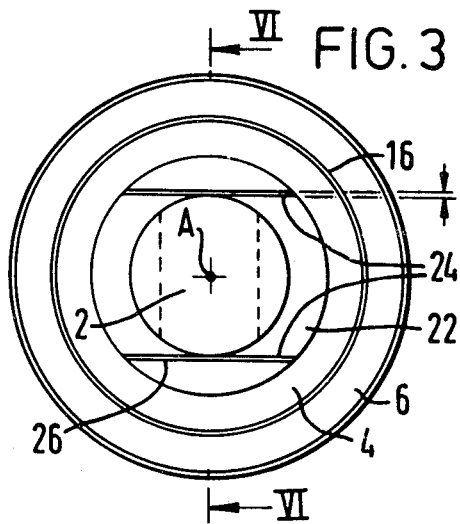
FIG. 3 is a view corresponding to FIG. 2 but showing an alternative embodiment.

In the embodiment of FIG. 3, the inner member 2 has a flange 22 on which parallel flats 24 are provided. The flange 22 is positioned in a parallel-sided slot 26 formed in the intermediate element 4. Again, there is a clearance between the flats 24 and the walls of the slot 26 to allow limited relative rotation between the pin 2 and the intermediate element 4.

In use of the bearing assembly described, small amplitude, high frequency movements result in relative movement between the pin 2 and the intermediate element 4, this movement being accommodated by the elastomeric sleeve 14. However, when the movement is great enough to cause the teeth 18 (FIG. 2) to engage one another or the flats 24 (FIG. 3) to come into contact with the walls of the slot 26, further relative movement between the pin 2 and the intermediate element 4 is prevented. Instead relative movement takes place between the intermediate element 4 and the bearing ring 6, with the intermediate element 4 sliding over the self-lubricating liner 16.

It will be appreciated that, because the outer surface of the intermediate element 4 is spherical, relative movement between the components 10 and 12 can also take place about axes which are perpendicular to the longitudinal axis of the inner member 2. The bearing assembly will then function in a similar manner as described, with small amplitude movements being accommodated by the elastomeric sleeve 14, and larger amplitude movements being accommodated by sliding of the intermediate element 4 on the liner 16.

The liner 16 may be adhesively bonded to the bearing ring 6. Alternatively, the entire bearing ring 6 may be made from self-lubricating material. The pin 2, the elastomeric sleeve and the intermediate element 4 may be bonded together or they may be assembled with tight fits.

Figure 4:
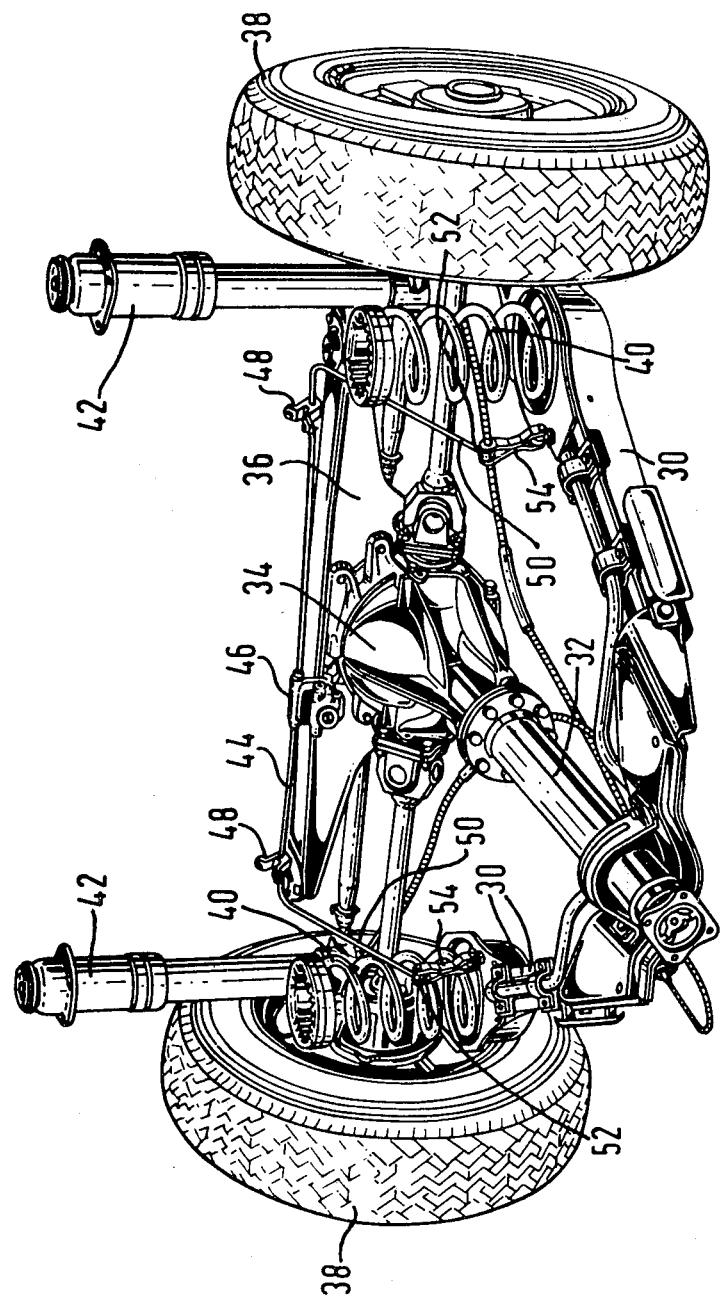
FIG. 4 shows a rear suspension assembly of a motor vehicle, including bearing assemblies similar to those shown in FIGS. 1 to 3.
Figure 5:
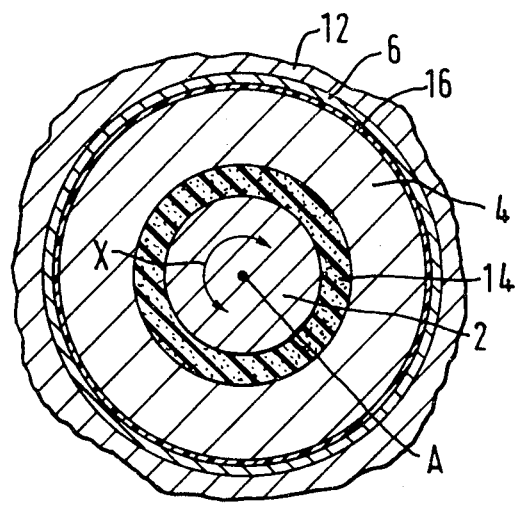
FIG. 5 is a partial cross-section of the embodiment of FIG. 3 showing the elements thereof that correspond to the like elements of FIG. 1.
Figure 6:
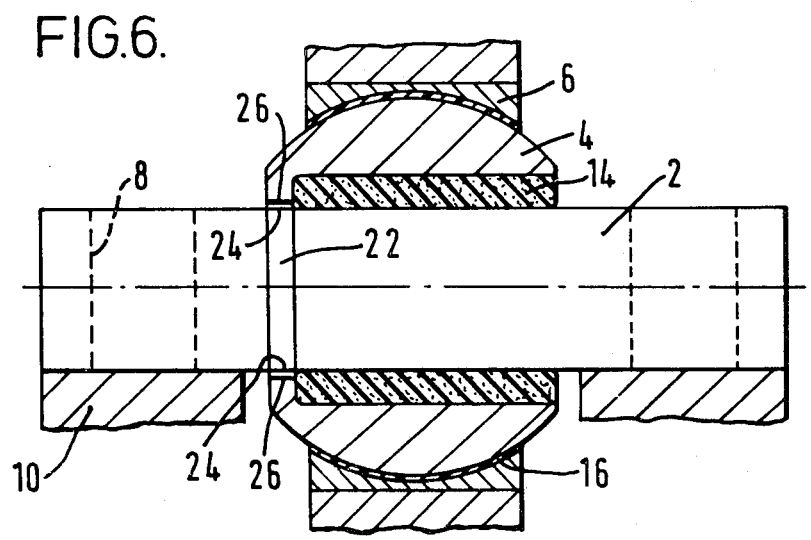
FIG. 6 is a partial cross-section of the embodiment FIG. 5 taken along a plane that is similar to the cross-sectional plane of FIG. 1.
Figure 7:
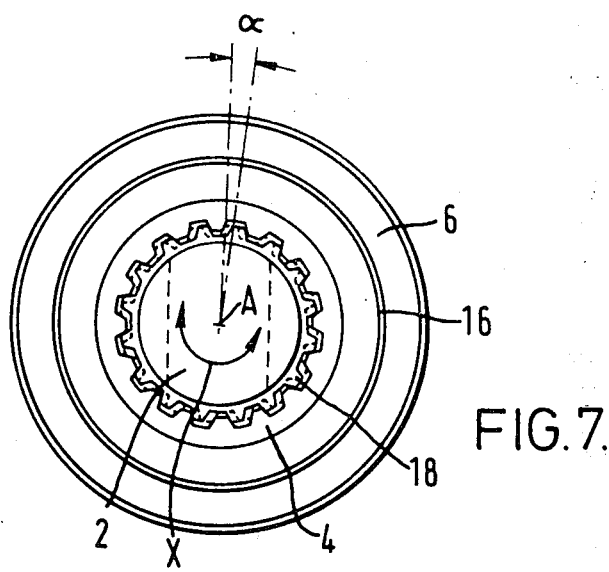
FIG. 7 is another view of the embodiment of FIG. 2, showing relative rotation by arrows and the symbol α, which corresponds to the limit of the relative rotation between the inner member 2 and the intermediate element 4.
Figure 8:
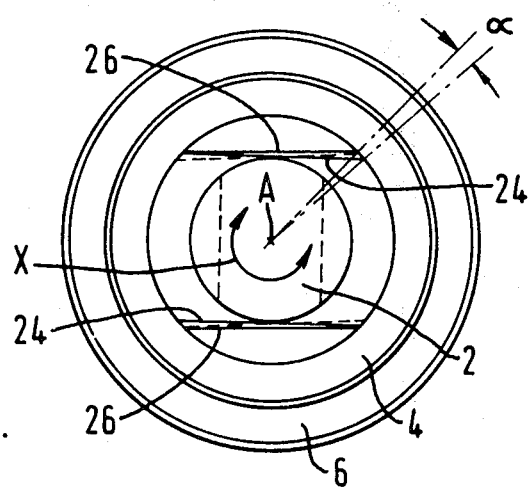
FIG. 8 is another view of the embodiment of FIG. 3, showing relative rotation by arrows and the symbol α, which corresponds to the limit of the relative rotation between the inner member 2 and the intermediate element 4.

FIG. 4 shows a rear suspension assembly of a motor vehicle, illustrating one application of a bearing similar to those described above.

The assembly of FIG. 4 comprises a pair of diagonal semi-trailing arms 30 which, in use, are pivotably connected to the floorpan of the vehicle. A tube 32 accommodates a propeller shaft and is secured to a final drive casing 34, which is mounted on a cross-member 36. The cross-member 36 supports the body of the vehicle. Rear wheels 38 are mounted on hubs fixed to the arms 30 and are independently movable relative to the cross-member 36, against the force of coil springs 40. Such movement is damped by dampers 42.

An anti-roll bar 44 is rotatably mounted at a central region to the cross-member 36 by a fitting 46. From the fitting 46, the anti-roll bar 44 extends transversely to both sides, and is supported on the floorpan of the vehicle by brackets 48, which allow torsional movement of the bar 44. The anti-roll bar 44 has two forwardly-extending limbs 50 which are secured to the respective arms 30 by bearings 52 similar to those described with reference to FIGS. 1 to 3. Shackles 54 accommodate the relative movement which occurs between each bearing 52 and the respective arm 30.

In operation, the anti-roll bar resists rolling of the vehicle about the longitudinal axis of the vehicle, while having no effect on up-and down movement of the vehicle. Thus the anti-roll bar has a stiffening effect about the longitudinal axis of the vehicle and resists unequal displacement of the wheels 38.

During travel of the vehicle, small road imperfections will result in high frequency, low-amplitude movement at the bearings 52, and these movements will be taken up in the elastomeric sleeve 14 (FIG. 1). Larger deflections of the rear wheels relative to the vehicle body, for example when the vehicle rides over a rough surface or corners at speed, will cause greater movement at the bearings 52. This movement may be beyond the limit set by the clearance 20 (FIG. 2), and so result in sliding movement between the intermediate element 4 and the bearing ring 6.

It will be appreciated that the continuously experienced high-frequency movements will not contribute to wear of the liner 16, so that the life of the bearing may be significantly increased.

I claim:

1. A bearing assembly comprising a first member, a second member, the first and second members being relatively movable, and an intermediate element which is disposed between the two members, and which is mounted resiliently on the first member and slidably engages the second member, relative movement between the first member and the intermediate element being limited by abutment of a portion of the intermediate element with a portion of the first member, whereby said relative movement results in resilient displacement between the first member and the intermediate element until the said portions of the intermediate element and the first member abut each other, whereafter continuation of said relative movement results in sliding displacement between the intermediate element and the second member; and in which the portion of the intermediate element comprises the walls of a parallel-sided slot and the portion of the first member comprises parallel flats provided on a flange of the first member.

2. A bearing assembly comprising a first member, a second member, the first and second members being relatively movable, and an intermediate element which is disposed between the two members, and which is mounted resiliently on the first member and slidably engages the second member, relative movement between the first member and the intermediate element being limited by abutment of a portion of the intermediate element with a portion of the first member, whereby said relative movement results in resilient displacement between the first member and the intermediate element until the said portions of the intermediate element and the first member abut each other, whereafter continuation of said relative movement results in sliding displacement between the intermediate element and the second member; and in which the intermediate element is mounted resiliently on the first member by means of an elastomeric element disposed between the intermediate element and the first member;

in which the elastomeric element comprises a sleeve;

in which the first member and the intermediate element are adapted to have a first clearance therebetween for movements of a first limited amplitude between the first member and the intermediate element;

in which the second member and the intermediate element are adapted to have a second means therebetween for the relative sliding movement of a second amplitude that is larger than the first amplitude;

in which the second member and the intermediate element have a self-lubricating liner forming said second means so that the intermediate element is in surface sliding contact with the liner;

in which the surface sliding contact allows rotational movement;

in which the first member has a longitudinally extending axis so that there can be relative rotational movement between the second member and the intermediate element around at least one axis that is perpendicular to the longitudinally extending axis of the first member;

in which the relative rotational movement accommodates at least two axes of rotation that are perpendicular to the longitudinally extending axis of the first member;

in which the first member is an inner member and the second member is an outer member; and in which the abutment of the portion of the intermediate element with a portion of the first inner member includes inter-engaging abutment portions.

3. The invention of claim 2 in which the inter-engaging abutment portions are adapted to provide a limited relative rotational movement therebetween corresponding to said first clearance.

4. The invention of claim 3 in which the first inner member includes a first component having an axis normal to said first longitudinal axis, and the second outer member includes a second component having an axis normal to said first longitudinal axis.

5. The invention of claim 4 in which relative movement occurs between the first and second components and includes relative movement about the axes that are perpendicular to the longitudinal axis of the first inner member.

6. A bearing assembly comprising a first member, a second member, the first and second members being angularly displaceable relatively to each other about a primary axis, and an intermediate element which is disposed between the two members and which is mounted on the first member and slidably engages the second member, relative angular displacement about the primary axis between the first member and the intermediate element being limited by abutment of a portion of the intermediate element with a portion of the first member so that relative angular displacement about the primary axis between the first member and the intermediate element can take place until the said portions of the intermediate element and the first member abut each other, whereafter continuation of said relative angular displacement about the primary axis results in sliding angular displacement between the intermediate element and the second member;

in which the first member and the intermediate element are adapted to have a first clearance therebetween for an angular displacement of a first limited amplitude between the first member and the intermediate element;

in which the second member and the intermediate element are adapted to have a second means therebetween for the relative sliding angular displacement of a second amplitude that is larger than the first limited amplitude;

in which the second member and the intermediate element have a self-lubricating liner forming said second means so that the intermediate element is in surface sliding contact with the liner;

in which the surface sliding contact allows full rotation of the intermediate element relatively to the second member about the primary axis;

in which the intermediate element is pivotable relatively to the second member about at least one axis that is perpendicular to the primary axis;

in which the intermediate element is pivotable relatively to the second member about at least two secondary axes that are perpendicular to the primary axis;

in which the first member is an inner member and the second member is an outer member; and in which the abutment of the portion of the intermediate element with the portion of the first inner member includes inter-engaging abutment portions.

7. The bearing assembly of claim 6 in which the inter-engaging abutment portions are adapted to provide limited relative rotational movement therebetween corresponding to said first clearance.

8. The bearing assembly of claim 7 in which the intermediate element is mounted resiliently on the first member so that the relative angular displacement therebetween results in the resilient angular displacement between the first member and the intermediate element.

9. A bearing assembly as claimed in claims 1, 2 or 6, in which the portions limit relative pivotal movement between the intermediate element and the first member to ±3°.

10. A bearing assembly as claimed in claims 1, 2 or 6, in which a self-lubricating liner is provided between the intermediate element and the second member.

11. A bearing assembly as claimed in claims 1, 2 or 6, in which the engaging surfaces of the intermediate element and the second member are part-spherical.

12. A bearing assembly as claimed in claims 1, 2 or 6, in which the first member is disposed radially within the second member.

* * * * *